June 5, 1945.   C. A. TEA ET AL   2,377,462
BURRING TOOL
Filed Feb. 22, 1943

INVENTORS
Clark A. Tea
Karl H. Luther
BY Harness, Dickey & Pierce
ATTORNEYS

Patented June 5, 1945

2,377,462

UNITED STATES PATENT OFFICE 2,377,462

BURRING TOOL

Clark A. Tea, Detroit, and Karl H. Luther, Dearborn Township, Wayne County, Mich., assignors to The Murray Corporation of America, Detroit, Mich., a corporation of Delaware Application February 22, 1943, Serial No. 476,682

5 Claims. (Cl. 77—73.5)

This invention relates to burring tools, and particularly to a burring tool having a piloted cutter which is rotated a predetermined amount under a predetermined pressure to perform the burring operation.

When holes are drilled in sheets of aluminum, the metal adjacent to the hole burrs outwardly of both faces of the sheets and must be removed, before a riveting operation is performed thereon. Drills and like cutting tools were hand-manipulated in the apertures for removing the burrs, but, since the amount of pressure and rotation of the tool was left to the judgment of the operator, the surface of the metal was either damaged or the aperture was chamfered because too much metal was removed.

The present tool overcomes this difficulty by controlling the amount of pressure which may be applied and the amount of rotation employed when performing the burring operation. A milling type of cutter is utilized which readily cuts away the metal of the burr when rotated a predetermined amount under an applied pressure produced by the cutter-supporting tool. The cutter is provided with a pilot on the end which projects into the aperture and locates the cutter relative to the burr, which is quickly removed without damaging the metal adjacent to the aperture. Only a slight clearance angle is provided on the cutting edges, so that the burr may be entirely removed without damaging the surface of the sheet.

The tool embodies a spindle, on the end of which the cutting tool is threaded or otherwise secured and about which a wire is helically attached and received by a slot in a flange on a tube which extends over the spindle. The tube contains a spring which rests upon a sleeve disposed over the spindle and abuts against the end of a handle which is secured to the end of the tube. Outlet openings are provided through the tube, and the handle for permitting the escape of air which would otherwise be trapped within the hollow space of the handle and tube.

When a burr is to be removed from an aperture in a sheet, the cutting tool is supported on the axis of the aperture by the pilot extending forwardly of the cutting face. The handle is pushed toward the sheet to provide a predetermined pressure to the cutting tool which is rotated through the action of the flange of the sleeve operating over the helical wire disposed about the spindle. The helical disposition of wire is such that substantially one and one-half turns of the cutting tool occur under predetermined spring pressure each time the handle is pushed toward the sheet. One operation of the handle is usually sufficient to remove the burr formed about the aperture in aluminum sheets without any danger of machining beyond an amount required to remove the burr.

Accordingly, the main objects of this invention are: to provide a tool for removing the burrs about apertures which produces a predetermined number of revolutions under predetermined spring pressure for each operation; to provide a burring tool having a rotatable spindle and a piloted cutting tool on the end which is rotated by the movement of an operating handle over the spindle while applying a predetermined pressure thereto; to provide a burring tool for removing the burrs of apertures, comprising a spindle having a helical wire welded or otherwise secured thereto, which engages a slot in a tube which is supported by a handle in which a spring is disposed for applying a predetermined pressure to the tool as the tool is rotated by a movement of the handle and tube over the spindle; and, in general, to provide a tool for removing burrs which is simple in construction, positive in operation, and economical of manufacture.

Other objects and features of novelty of this invention will be specifically pointed out or will become apparent when referring, for a better understanding of the invention, to the following description, taken in conjunction with the accompanying drawing, wherein.

Figure 1:
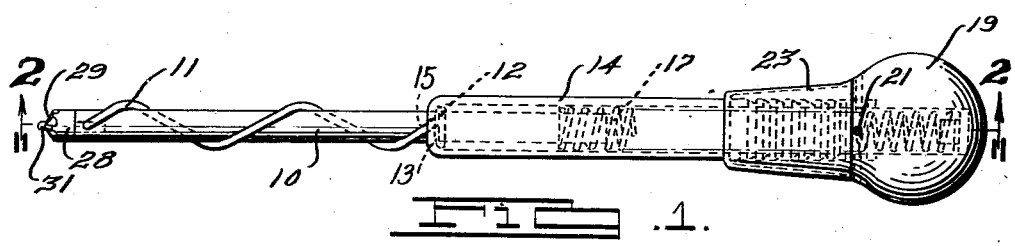
Figure 1 is a view in elevation of a burring tool embodying features of this invention.
Figure 2:
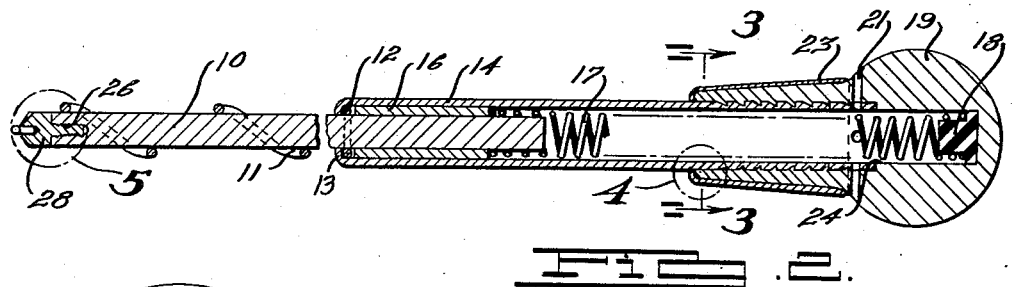
Fig. 2 is an enlarged sectional view of the structure illustrated in Fig. 1, taken on the line 2—2 thereof.
Figures 3, 4:
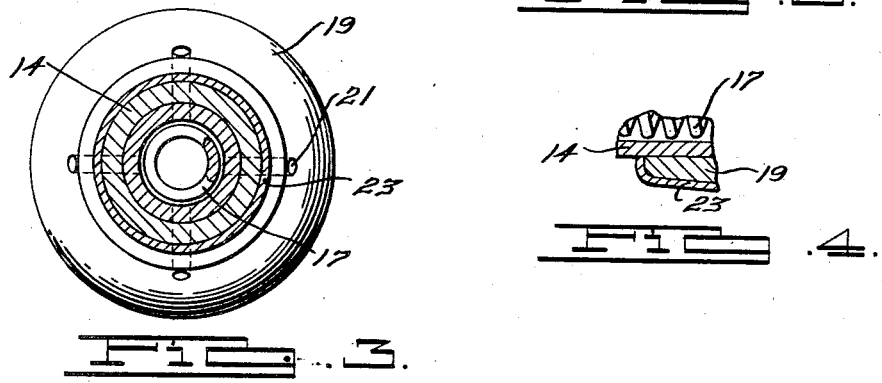
Fig. 3 is an enlarged sectional view of the structure illustrated in Fig. 2, taken on the line 3—3 thereof.
Fig. 4 is an enlarged, broken sectional view of the structure illustrated in Fig. 2, within the circle indicated by the numeral 4.
Figures 5, 6:
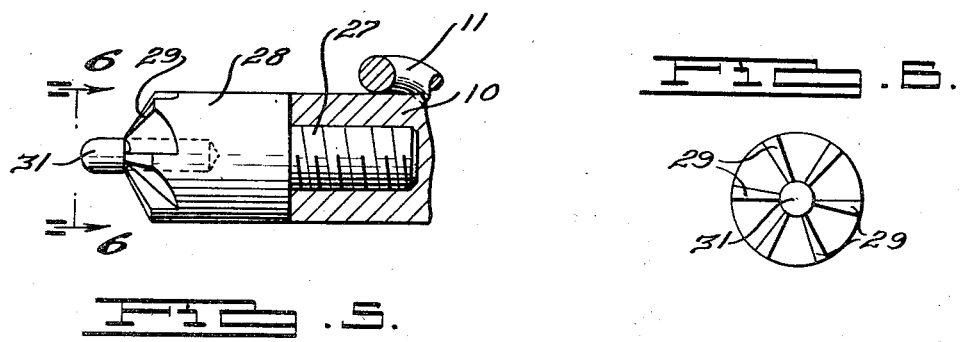
Fig. 5 is an enlarged broken sectional view of that portion of the tool illustrated in Fig. 2, within the circle indicated by the numeral 5.
Fig. 6 is an end view of the structure illustrated in Fig. 5, as viewed from line 6—6 thereof.

The burring tool comprises a spindle 10 having a helical wire 11 welded or otherwise secured thereto. The upper end of the wire is formed in a loop 12 received within a flange 13 of a sleeve 14. The wire extends through a slot 15 within the flange 13 which produces the rotation of the spindle as the flange moves downwardly thereover. A sleeve 16 is rotatively disposed over the upper end of the spindle adjacent to the loop 12. A spring 17 is disposed over the upper end of the spindle 10 in abutting relation to the sleeve 16, while the upper end extends over a rubber bumper 18 within the hollow interior 24 of a handle 19 which is secured to the end of the sleeve 14.

A plurality of apertures 21 extend through the handle and the sleeve above a ferrule 23 attached to the lower portion of the handle. The passageways formed by the apertures permit the escape of air from within the sleeve and the hollow interior 24 of the handle, so that the only pressure that can be applied to the spindle will be that of the spring 17. In view of the locked or trapped air within the handle, the rubber bumper 18 is relied upon for cushioning the engagement of the spindle 10 therewith. The lower end of the spindle 12 is threaded at 26 for receiving the threaded stem 27 of the cutting tool 28. A plurality of cutting edges 29 are provided on the end face of the tool which are disposed at an angle to the tool axis and provided with relief and chip-receiving recesses in the conventional manner. A pilot 31 extends forwardly of the end of the tool on the tool axis and may be press-fitted within an aperture in the end of the tool or otherwise secured thereto.

In operation, when a burr is to be removed from the edge of an aperture, the pilot 31 is disposed within the aperture and pressure is applied at the handle to move the sleeve 14 over the spindle 10. The spring 17 provides a predetermined pressure to the cutting tool 28 while rotation is applied thereto through the movement of the flange 13 of the sleeve over the helically disposed wire 11. The pressure and rotation provided to the spindle are sufficient to produce a burring operation with a single movement of the handle. This assures the removal of the burr without removing metal from the wall of the aperture. The tool eliminates the personal equation which was present heretofore when an ordinary drill or similar tool was manually manipulated for removing the burrs.

What is claimed is:

1. In a burring device, a rotatable spindle, a wire helically disposed on such spindle in fixed engagement therewith throughout the length of the wire, a sleeve longitudinally movable over said spindle having driving engagement with the wire to rotate said spindle, a spring within said sleeve for regulating the pressure applied to the spindle, and a cutter on the end of the spindle having a plurality of relieved cutting edges which are rotated over the burr a predetermined number of times under a predetermined pressure as the sleeve is moved over the spindle.

2. In a burring device, a rotatable spindle, a cutting tool on the end of said spindle, a sleeve longitudinally movable over said spindle, a hollow handle on said sleeve, a spring disposed over said spindle within said handle for applying a predetermined pressure thereto, a wire helically disposed about the body of the spindle in contact therewith and secured thereto in fixed position, a flange on the end of said sleeve having a slot to receive said wire for producing the rotation of the spindle when the sleeve is longitudinally moved thereover, and a plurality of apertures extending through said sleeve for providing communicating passageways between the interior and the exterior of said sleeve to prevent the pressure of air within the handle from applying a greater force than that applied through the spring which is proportioned to produce a burring operation with a single movement of the sleeve.

3. In a burring tool, a spindle, a wire helically disposed on said spindle having a loop at its upper end and engaging the spindle throughout its length, a sleeve having an inturned slotted flange disposed over said spindle, wire, and said loop. a second sleeve on the upper end of said spindle abutting said loop, a spring having one end disposed over said spindle and abutting the end of said second sleeve, a handle supported on said first sleeve having a hollow interior for receiving the other end of said spring, a cutter secured to the end of said spindle having a plurality of cutting edges on its end face, and a pilot extending from the end of said cutter on the axis thereof, the tension of the spring being proportioned to the helical lead of the wire and the number of cutting edges of the tool to produce the necessary annular movement to the cutting tool with a predetermined pressure to perform a burring operation with a single forward movement of the handle.

4. In a device for removing burrs from an aperture in an element, a spindle, a helically disposed wire surrounding and snugly engaging said spindle and secured in fixed relation thereto, a sleeve extending over said spindle and wire having an inwardly disposed flange containing a slot in which the wire projects, a tubular element disposed over the upper end of said spindle in engagement with one end of said wire, a spring abutting said element, a hollow handle disposed on the outer end of said sleeve into which the outer end of the spring projects, and a burring tool on the end of the spindle having a plurality of cutting edges, the tension of the spring, the slope of the helix on which the spring is disposed and the number of cutting edges being so proportioned relative to each other as to have the edges completely remove a burr without damaging the metal about the aperture upon a single complete movement of the handle.

5. In a device for removing burrs from the edge of an aperture of an element, a spindle, a helically disposed wire surrounding said spindle having its lower end welded thereto and having a loop on its upper end encompassing said spindle, a sleeve extending over said spindle and wire having an inwardly disposed flange containing a slot in which said wire projects, a tubular element on said spindle having one end abutting said loop, a hollow handle disposed on the outer end of the spindle, a spring within said sleeve having one end engaging said tubular element and the other end abutting the handle, and a burring tool on the outer end of the spindle, the interior of said handle being connected by a passageway to the exterior thereof to prevent pressure from building up therein which would increase the applied pressure over that produced by the spring, the tension of which is proportioned to the degree of rotation produced to the spindle and the cutting characteristics of the tool to produce a burring operation upon the complete movement of the sleeve over the spindle.

CLARK A. TEA.
KARL H. LUTHER.